US006969081B2

(12) United States Patent
Whyte

(10) Patent No.: US 6,969,081 B2
(45) Date of Patent: Nov. 29, 2005

(54) BICYCLE REAR SUSPENSION

(75) Inventor: Jon Frank Ross Whyte, Greet, Winchcombe (GB)

(73) Assignee: ATB Sales Limited, East Sussex (GB)

(*) Notice: Subject to any disclaimer, the term of this patent is extended or adjusted under 35 U.S.C. 154(b) by 0 days.

(21) Appl. No.: 10/494,445

(22) PCT Filed: Oct. 25, 2002

(86) PCT No.: PCT/GB02/04869

§ 371 (c)(1),
(2), (4) Date: May 3, 2004

(87) PCT Pub. No.: WO03/037701

PCT Pub. Date: May 8, 2003

(65) Prior Publication Data

US 2004/0256834 A1 Dec. 23, 2004

(30) Foreign Application Priority Data

Nov. 1, 2001 (GB) .................................... 0126264

(51) Int. Cl.[7] ............................................... B62K 25/28
(52) U.S. Cl. ...................................................... 280/284
(58) Field of Search ................................ 280/283, 284, 280/274, 275, 281.1

(56) References Cited

U.S. PATENT DOCUMENTS 5,452,910 A * 9/1995 Harris ........................ 280/284
5,509,679 A 4/1996 Leitner
5,611,557 A 3/1997 Farris
5,628,524 A * 5/1997 Klassen et al. ............. 280/284
5,678,837 A 10/1997 Leitner
5,791,674 A 8/1998 D Aluisio
5,899,480 A 5/1999 Leitner
6,131,934 A 10/2000 Sinclair
6,378,885 B1 4/2002 Ellsworth
6,471,230 B2 * 10/2002 Ellsworth et al. ........... 280/284
6,488,301 B2 * 12/2002 Klassen et al. ............. 280/284
2003/0038450 A1 * 2/2003 Lam .......................... 280/284

FOREIGN PATENT DOCUMENTS

DE 299 09 626 U 9/1999
EP 1 026 073 A 8/2000
FR 2 774 966 A 8/1999

* cited by examiner

*Primary Examiner*—Kevin Hurley
(74) *Attorney, Agent, or Firm*—Sughrue Mion, PLLC

(57) ABSTRACT

A bicycle comprises a frame (10) a rear wheel (14) and a rear suspension, which comprises a swing arm (17) carrying the wheel and two pivot links (18, 19) spaced from one another in the fore and aft direction of the bicycle and coupling the arm to the frame to form, together with the frame, a four-bar linkage movable between a first end settings in an unloaded state of the suspension and a second end setting in a loaded state of the suspension. The links (18, 19) are each pivotably connected with the frame outwardly of the wheel circumference and are arranged so that on movement of the linkage from the first to the second end setting an instantaneous pivot center (21) defined by the intersection of two axes (22, 23) each containing the pivot points of a respective one of the links (18, 19) moves downwardly and rearwardly with respect to the fore and aft direction.

18 Claims, 2 Drawing Sheets

BICYCLE REAR SUSPENSION

Figure 1:
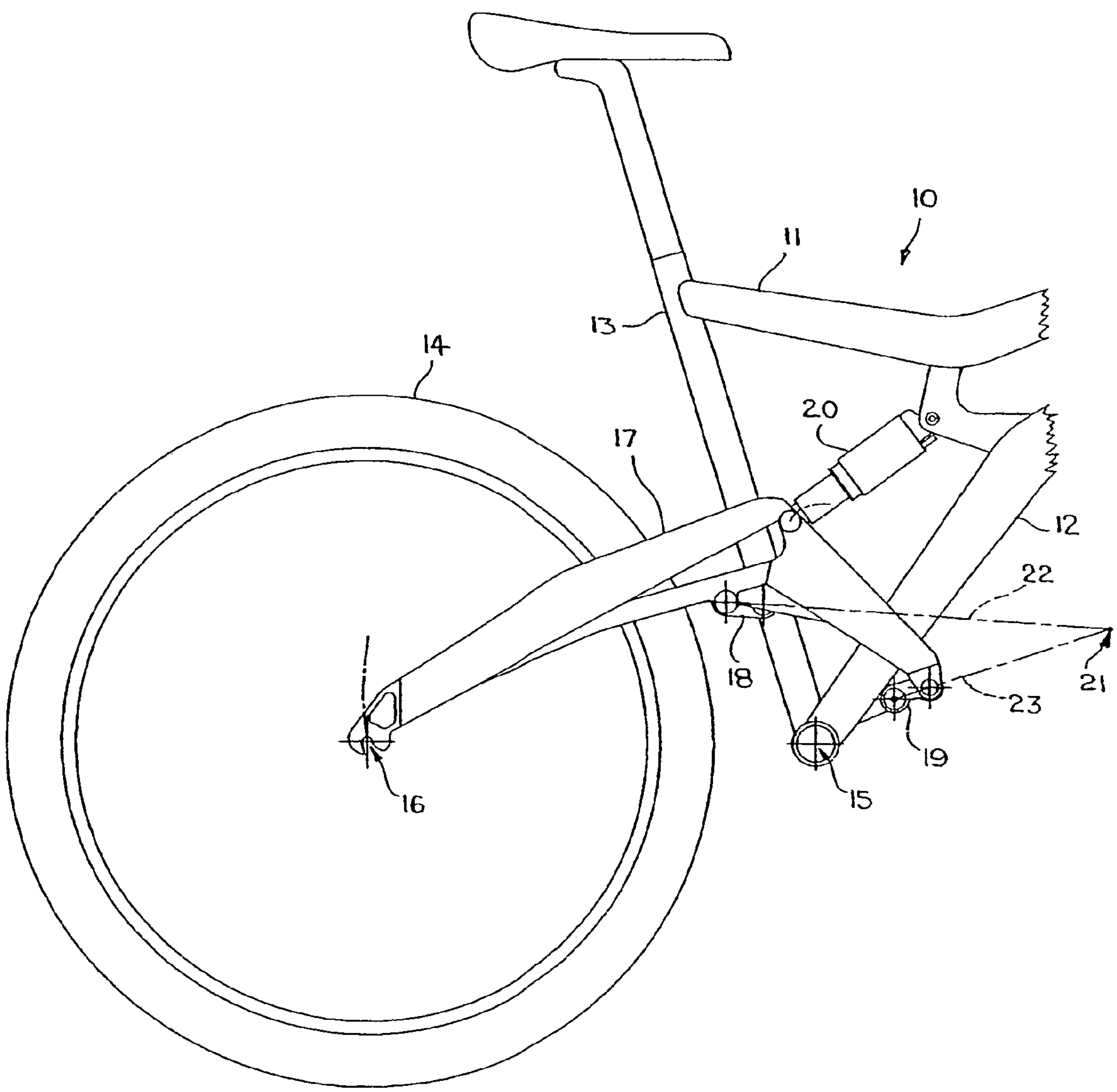

The present invention relates to a bicycle and has particular reference to a rear wheel suspension in a bicycle.

Bicycles intended for off-road and other rough terrain uses commonly have rear suspension systems permitting sprung movement of the rear wheel relative to the bicycle frame. A basic system is represented by a rearwardly extending swing arm carrying the rear wheel and pivotably connected to a seat tube or down tube of the bicycle frame. A spring and damper unit is coupled between the spring arm and the frame to control pivot movement of the arm under suspension travel. The swing arm is usually a sturdy cast or fabricated member which is suitably stiff in bending and which can incorporate robustly formed journals for pivot connection to the frame and the spring and damper unit. The sturdiness of the swing arm is highly desirable for acceptance of the shock loads acting on the suspension during off-road use, but the simple arc executed by the swing arm during suspension travel imposes a compromise with respect to the suspension behaviour. In particular, the drive force transmitted to the rear wheel by the usual chain-and-sprocket transmission during a power stroke applied by a rider tends to pivot up the swing arm and wheel independently of bump response of the suspension. The arm is then able to pivot down again in the interval until the next power stroke, which results in a bobbing effect or at least some degree of feedback from the foot pedal cranks which usually feed the drive force to the transmission.

These disadvantageous effects can be counteracted by more complex multi-element suspension linkages, of which the four-bar linkage is particularly effective from the viewpoint of controlling rear wheel movement in the course of suspension travel. Such a linkage can, depending on the position of its pivot centre, generate a counterbalancing force tending to pull the rear wheel down in opposition to the tendency of the wheel to move up during the power stroke of the rider. Generation of the counterbalancing force requires a relatively high pivot centre of the linkage and such a high location also confers the advantage that the rear wheel path has a more rearward initial direction to enable a better response to bumps. However, a high pivot centre location introduces the problem of disturbance to the pedal action by a constantly changing chain length, thus pedal feedback, when the suspension has to cope with a continuously bumpy surface. In addition, large changes in chain length, i.e. changes in effective length caused by increase and decrease in the length of an idle zone of the chain, cannot be readily absorbed by conventional gear changing systems based on chain displacement between coaxial sprockets of different diameter.

Problems of this nature can be resolved by designing the four-bar linkage so that its instantaneous pivot centre moves down and back towards the pedal crank axis as the linkage displaces under progressive, bump-induced suspension travel. One such linkage is disclosed in U.S. Pat. No. 5,509,679 and subsequent continuation specifications, in which the linkage is composed of two rearwardly extending lower arms disposed one on each side of the wheel and pivotably connected to a frame seat tube, two upwardly extending parallel upper arms similarly disposed one on each side of the wheel and pivotably connected to the lower arms near the wheel axis and a short upper link pivotably coupling the upper arms to the seat tube at a spacing above the point of connection of the lower arms. The length of seat tube between the two pivot connections represents the fourth element of the linkage. A spring and damper unit is angled between the short upper link and the frame. The relationship and dimensions of the constituent elements of this four-bar linkage have the result that the instantaneous pivot centre—represented by the instantaneous point of intersection of the two notional axes respectively containing the fulcra of the short upper link and the fulcra of the lower arms—does indeed displace rearwardly and downwardly during linkage compression. However, the length of the lower arms and the point of pivot connection to the frame impose a limit on the extent of vertical shift of the instantaneous pivot centre. More significantly, the provision of paired upper and lower arms, the lengths of these arms and the pivot interconnection thereof near the rear wheel axis detract from the rigidity of this part of the linkage and the suspension as a whole tends to be appreciably less robust and less resistant to lateral flexing than suspension systems based on a single swing arm. The siting of the spring and damper unit also imposes constraints and, in practice, modification of the frame to a more complex shape has been needed to accommodate a spring and damper unit offering an effective stroke.

Other permutations of four-bar linkage rear suspensions in commercially available bicycles include a design with a triangular wheel carrier frame representing one element of the linkage and articulated to the bicycle frame, part of which forms another element of the linkage, by a short upper link and a short lower link below the upper link. The upper link has an extension providing a coupling point for a spring and damper unit connected to the bicycle frame down tube. This design yields primarily a downward displacement of the instantaneous pivot centre during suspension bump response, but without significant approach to the pedal crank axis, and the triangular carrier frame is a comparatively bulky component of the linkage. Moreover, lateral stiffness is prejudiced by the vertical relationship of the two links, which co-operate to define a hinge zone. A further known design overcomes the bulkiness of the carrier frame by provision of a robust swing arm which is articulated to the bicycle frame by a short upper link directed upwardly from the swing arm and a short lower link arranged below the upper link and directed forwardly and downwardly from the arm. Although the swing arm itself possesses structural rigidity, resistance to lateral flexing is again compromised by the disposition of the two links approximately in vertical alignment and the instantaneous pivot centre of the linkage moves forwardly rather than rearwardly during suspension compression, thus producing displacement of the pivot centre in a direction actually opposite to that desired to counteract bobbing.

The invention therefore has as its principal objective the provision of a bicycle with a rear suspension system which achieves the desired degree of suspension compliance in conjunction with resistance to bobbing, but without a penalty in terms of structural rigidity, especially resistance to lateral flexing.

A supplementary object is the provision of a rear suspension linkage which can be readily accommodated in a conventional bicycle frame design, thus without obliging special shaping, and for which a degree of freedom exists in specific dimensioning and disposition of the linkage elements. A further supplementary object is the design of a suspension with commonality of some parts, so as to ease production costs. Yet another supplementary object is the creation of a suspension layout with scope for variable mounting of springing and damping means to enable variation of springing and damping rates by simple measures.

Other objects and advantages of the invention will be apparent from the following description.

According to the present invention there is provided a bicycle comprising a frame, a rear wheel and a rear suspension which comprises a swing arm carrying the rear wheel and two pivot links spaced from one another in the fore and aft direction of the bicycle and coupling the arm to the frame to form therewith a four-bar linkage movable between a first end setting in an unloaded state of the suspension and a second end setting in a loaded state of the suspension, wherein the links are each pivotably connected with the arm and the frame outwardly of the wheel circumference and are arranged so that on movement of the linkage from the first to the second end setting an instantaneous pivot centre defined by the intersection of two axes each containing the pivot points of a respective one of the links moves downwardly and rearwardly with respect to said direction at a first rate over an initial part of the travel of the pivot centre and at a second rate reduced in relation to the first rate over a subsequent part of the travel of the pivot centre.

Through use of a swing arm and disposition of the pivot connections of the linkage outwardly of the wheel circumference the suspension can be based on a wheel carrier member meeting all requirements of strength, rigidity and relative ease of manufacture. The swing arm can be a cast, forged or fabricated component of desired shape, for example cranked or bent in its length to provide clearance for other components, such as a main sprocket wheel of a chain-and-sprocket drive of the bicycle. The two links can be kept short so that they can be constructed to be particularly stiff in bending and thus maintain overall rigidity of the four-bar linkage consisting of the rigid swing arm, the normally inherently stiff frame and the links. The rigidity of the linkage is enhanced by the spacing of the links in the fore and aft direction of the bicycle so that the linkage does not contain a hinge zone formed by a vertical or more-or-less vertical plane containing the pivot points of two of the links. At the same time, however, these links are disposed so that on upward movement of the rear wheel under bump response of the suspension the instantaneous pivot centre of the linkage moves downwardly and rearwardly with respect to the fore and aft direction. This provides the desired pivot behaviour of the four-bar linkage with respect to control of the direction of wheel movement to counteract the bobbing effect occurring, as described in the introduction, by tensioning of the chain of the chain-and-sprocket drive. In addition, because the movement of the instantaneous pivot centre over an initial part of its travel takes place at a first rate and over a subsequent part of its travel at a second rate reduced in relation to the first rate it is possible for the pivot centre to initially move relatively quickly when upward pivotation of the suspension occurs and thereafter to move at a slower rate.

The link orientations can be selected so that a rearward one of the links pivots through a greater angle than a forward one of the links during an initial phase of movement of the linkage from the first to the second end setting and through generally the same angle as the forward link during a final phase of that movement. Consequently, the initial movement of the pivot centre can be substantially along the axis of the forward link with only slight change in the position of that axis. For preference, the locus of the instantaneous pivot centre during its movement describes a first arc which is substantially convex upwardly and a second arc which is substantially concave upwardly. This locus essentially results from an initial upward and subsequent downward pivotation of the forward link. During the movement of the pivot centre, the locus thereof can be such as to pass through the pivot point of the forward one of the two links at the connection thereof with the frame, in particular at the point of transition from the upward to downward movement of that link or from the convex to the concave arc. The direction of movement of the pivot centre can be generally towards the axis of a pedal crank drive of the bicycle and the centre is preferably disposed adjacent to the axis of that drive in the second end setting of the linkage. This has the effect that the path of the rear wheel axis during compression of the suspension initially gives rapid increase in the distance between the axes of the rear wheel and the pedal crank drive, thus growth in length of a chain coupling a drive sprocket and driven sprocket respectively associated with the pedal crank drive and the rear wheel, and subsequently virtually no growth.

The orientations of the two links are preferably selected to be such that the rearward link extends forwardly and the forward link rearwardly from the arm with respect to the fore and aft direction of the bicycle, the forward link preferably also extending downwardly from the arm. The angular disposition of the links when they extend forwardly and rearwardly in the manner described is for preference such that they extend convergently in direction away from the rear wheel in the first end setting of the linkage. A particularly compact disposition of the links satisfying the requirements for their relative positioning is achieved if the rearward link is connected to the frame at a seat tube thereof and the forward link to the frame at a down tube thereof.

With respect to construction, the links can be substantially identical in shape and size so as to achieve a significant cost advantage in production as well as savings in procurement and stock-holding. The connection of the links to the swing arm and the frame can be effected by connecting means comprising, for example, deep-groove full complement bearings which provide substantially play-free pivot location of the links. The links can be machined or moulded components so that, for example, bearing fit can be accurately controlled without need for subsequent welding or heat treatment. Similarly, the frame and swing arm need only be drilled to accommodate pivot pins for the bearings. For preference a single continuous pivot pin is provided at each pivot point, which further contributes to the lateral stiffness of the suspension particularly at the locations most susceptible to play, i.e. the coupling points of the elements of the four-bar linkage. Other forms of connecting means are possible, including location of pins in the links and bearings in the arms and frame.

The suspension can be completed by a spring and damper unit pivotably connected with the arm and frame to provide sprung and damped travel of the linkage between its end settings. Location between the arm and frame allows scope for an effective stroke of the unit without obliging special shaping of members of the frame to the disadvantage of structural simplicity and strength and/or aesthetics. In addition to easier accommodation of the unit, provision can be made for adjustment of the position of the unit relative to the arm or frame for variation in the springing and damping rates. Due to the feature of rearward movement of the instantaneous pivot centre of the four-bar linkage under movement of the suspension, the initially large spacing of the wheel axis from that centre, which yields a large wheel to spring/damper ratio, subsequently reduces to correspondingly reduce the ratio. Consequently, by adjustment of the inclination of the line of action of the spring and damper unit relative to the axis of the forward one of the links, which changes the perpendicular distance of that line of action from the pivot centre, the wheel to spring/damper ratio can be altered in accordance with specific requirements. The adjustment facility can be such as to be readily carried out by the rider.

An embodiment of the present invention will now be more particularly described by way of example with reference to the accompanying drawings, in which:

FIG. 1 is a schematic elevation of the rear part of a bicycle embodying the invention; and FIGS. 2*a–e* are schematic diagrams showing five progressive stages of movement of a rear suspension linkage in the bicycle part illustrated in FIG. 1.

Referring now to the drawings there is shown part of a bicycle, for example a bicycle intended for off-road use ("mountain" bicycle), comprising a frame 10 with a crossbar 11, down tube 12 and seat tube 13. The crossbar 11 and down tube 12 may be united into a single component to the right of FIG. 1 and, whether so united or remaining separate, are connected to a steering assembly and front wheel forks or suspension (not shown) of the bicycle. At the junction of the down tube 12 and seat tube 13 there is provided a bearing location for a pedal crank drive fixedly connected with a drive sprocket of a chain-and-sprocket drive transmission (not shown) to a rear wheel 14 of the bicycle. A driven sprocket of the transmission is fixedly connected with an axle of the rear wheel and drive is transmitted from the drive sprocket to the driven sprocket by way of an endless chain. In the case of a drive transmission provided with gearing, several coaxial drive or driven sprockets of respectively different diameter may be provided together with a chain displacing device (derailleur mechanism) for displacing the chain between the sprockets of different diameter. Pedal crank drives and chain-and-sprocket drive transmissions are conventional components of bicycles and accordingly are not illustrated in FIG. 1. However, the axis of the pedal crank drive and drive sprocket(s) is denoted by 15 and the axis of the rear wheel axle and the drive sprocket(s) by 16.

The rear wheel 14 is suspended by a rear suspension comprising a swing arm 17 which carries an axle rotatably mounting the rear wheel, an upper, rearward link 18 extending forwardly of the arm and pivotably connecting the swing arm with the seat tube 13 and a lower, forward link 19 extending rearwardly of the arm and pivotably connecting the swing arm with the down tube 12. The swing arm, links and the part of the frame between the pivot connection points of the links represent the elements of a four-bar linkage. The swing arm 17 is fabricated from sheet aluminium or aluminium alloy, but could equally well be produced from other materials and could be cast, forged, machined or constructed in any other suitable manner. It is cranked in its length to rise above the zone of the drive sprocket of the transmission and to provide a shape compatible with the desired disposition of the coupling points of the four-bar linkage elements. The two links 18 and 19 are short components machined from aluminium, aluminium alloy, steel or other material or made by forging, casting, stamping, fabricating, moulding or any other suitable method from metallic or other appropriate material or materials, preferably a material of light weight and high strength. Each link has two accurately machined bores providing locations for deep-groove, full complement bearings, i.e. bearings with bearing balls in direct contact with one another, rather than separated by webs of a cage, and seated in deep grooves providing both radial and lateral (thrust) location of the balls. The bearings receive pivot pins fixed in the swing arm and in the frame tubes or brackets attached thereto. The two links can be identical in construction to provide savings in manufacturing and purchasing cost.

The four-bar linkage constructed and arranged as described in the preceding paragraph represents a particularly sturdy wheel-carrying structure with good resistance to lateral flexing. This resistance is promoted by the short lengths of the links 18 and 19 and their disposition at a spacing in the fore and aft direction of the bicycle; this spacing ensures that there is no coincidence, in a vertical or nearly vertical plane, of pivot points of the links such as to form a hinge zone reducing the transverse stiffness of the suspension.

The bicycle additionally includes a spring and damper unit 20 which is pivotably connected with the swing arm 17 in the vicinity of the bend therein and with a bracket between the crossbar 11 and down tube 12. The connection of the unit 20 with the arm 17 can be adjustable to enable variation in the orientation of the unit in a vertical plane relative to the bicycle fore and aft direction.

As is evident from FIG. 1, the swing arm 17, under the control of the remaining elements of the four-bar linkage, is able to pivot upwardly in response to bumps encountered by the rear wheel 14 during use of the bicycle. In particular, the linkage is able to move between a first end setting in an unloaded state of the bicycle, thus with the rear wheel in a lowermost position, and a second end setting in a fully loaded state of the bicycle, thus with the rear wheel in an uppermost position. The end settings are defined by, respectively, maximum extension and maximum compression of the spring and damper unit 20. The lengths and relative dispositions and orientations of the links 18 and 19 are such that during travel of the linkage from the first end setting to the second end setting the rearward link 18 pivots upwardly (at its rearward end) in the course of an initial phase of such travel while the forward link 19 pivots upwardly (at its forward end) only very slightly. In the course of a further and final phase of such travel the rearward link 18 continues to pivot upwardly while the forward link 19 now pivots slightly downwardly. The forward link thus executes a reciprocating motion. This action of the links 18 and 19 produces a shift in the instantaneous pivot centre of the linkage and consequently a desired displacement of the swing arm 17 and rear wheel 14 from the viewpoint of counteracting the bobbing effect induced in the chain-and-sprocket transmission by the power stroke exerted by the rider of the bicycle. The instantaneous pivot centre, which is denoted by 21 in FIG. 1, is defined by the point of intersection of an axis 22 containing the pivot points of the rearward link 18 and an axis 23 containing the pivot points of the forward link 19.

Figure 2A:
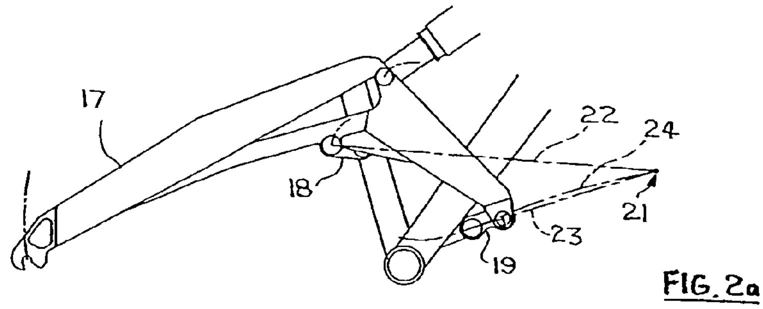
Figure 2B:
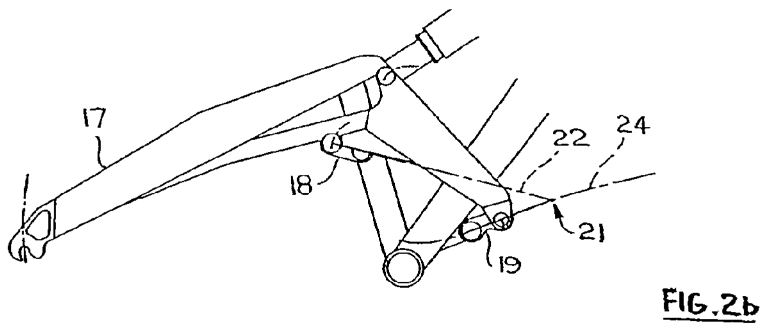
Figure 2C:
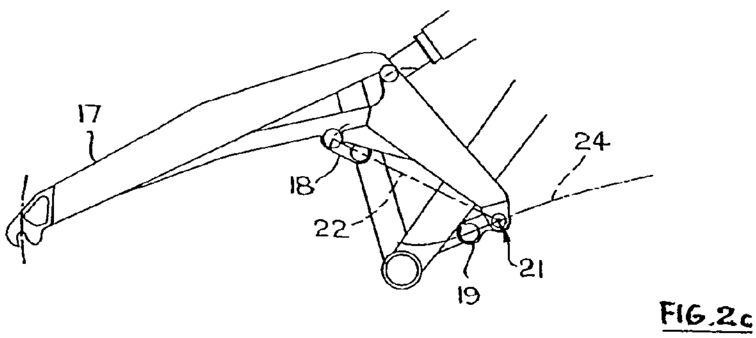
Figure 2D:
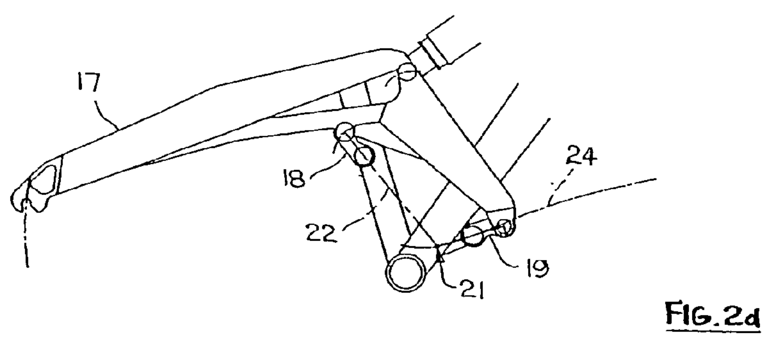
Figure 2E:
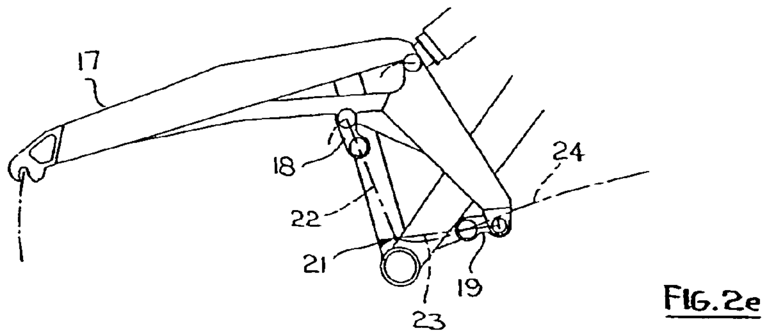

The locus 24 of the instantaneous pivot centre 21 under upward pivotation of the swing arm 17 is evident from the five diagrams of FIGS. 2*a* to 2*e*, which illustrate different positions of the swing arm in the course of such movement and thus different settings of the four-bar linkage between its first setting (FIG. 2*a*) and second end setting (FIG. 2*e*). As shown, the locus 24 describes—progressing rearwardly from the foremost disposition of the pivot centre 21—a shallow convex arc and then a shallow concave arc. The locus passes through the point of pivot connection of the lower link 19 with the frame, at which point the transition from the convex portion to the concave portion of the locus occurs. The relatively small deviation of the locus from the axis 23 of the forward link 19 reflects the minimal pivotation of that link, which manifests itself during the initial phase of movement of the linkage from the first to the second end setting as a relatively rapid rearward and downward travel of the instantaneous pivot centre 21. Only in the final phase of travel of this pivot centre do the two links 18 and 19 move at similar rates through a similar angle, which ultimately produces a relatively slow movement of the centre and brings it into close proximity with the axis 15 of the pedal crank drive. As explained in the introduction, this course of movement of the pivot centre represents the desired course from the viewpoint of minimising changes in chain length so as to counteract bobbing or pedal feedback. In addition, the minimal change in chain length assists the action of a chain-displacing or derailleur mechanism if provided.

The described pivot action of the four-bar linkage has an equally advantageous influence on the springing and damping supplied by the spring and damper unit 20. When the linkage is in its first end setting, i.e. the suspension unloaded (FIG. 2*a*), the distance between the rear wheel axis 16 and the instantaneous pivot centre 21 is large and the wheel to spring/damper ratio is similarly large. In the second end setting of the linkage (FIG. 2*e*), the distance is significantly smaller and the wheel to spring/damper ratio is smaller. If the unit 20 has an appropriately adjustable point of pivot connection with the swing arm 17 or frame 10, the inclination of the unit relative to the axis 23 of the forward link 19 can be altered. This effectively changes the perpendicular distance of the line of action of the unit 20 from the pivot centre 21 so as to enable possible selection of a rising, linear or falling wheel to spring/damper ratio; the particular configuration illustrated in the drawings provides a slightly rising rate.

A bicycle embodying the invention, thus a bicycle incorporating a rear wheel suspension as described in the foregoing, combines a sturdy wheel-carrying structure with an intelligent wheel path under suspension action and additionally offers the possibility of an intelligent wheel to spring/damper ratio.

What is claimed is:

1. A bicycle comprising a frame, a rear wheel and a rear suspension which comprises a swing arm carrying the rear wheel and two pivot links spaced from one another in the fore and aft direction of the bicycle and coupling the arm to the frame to form therewith a four-bar linkage movable between a first end setting in an unloaded state of the suspension and a second end setting in a loaded state of the suspension, wherein the links are each pivotably connected with the arm and the frame outwardly of the wheel circumference and are arranged so that on movement of the linkage from the first to the second end setting an instantaneous pivot centre defined by the intersection of two axes each containing the pivot points of a respective one of the links moves downwardly and rearwardly with respect to said direction at a first rate over an initial part of the travel of the pivot centre and at a second rate reduced in relation to the first rate over a subsequent part of the travel of the pivot centre.

2. A bicycle as claimed in claim 1, wherein a rearward one of the links pivots through a greater angle than a forward one of the links during an initial phase of movement of the linkage from the first to the second end setting and through substantially the same angle as the forward link during a final phase of that movement.

3. A bicycle as claimed in claim 1 or claim 2, wherein the locus of the instantaneous pivot centre during said movement thereof describes a first arc which substantially convex upwardly and a second arc which is substantially concave upwardly.

4. A bicycle as claimed in claim 1, wherein the locus of the instantaneous pivot centre during said movement thereof passes through the pivot point of a forward one of the links at the connection thereof with the frame.

5. A bicycle as claimed in claim 1, wherein the direction of said movement of the instantaneous pivot centre is generally towards the axis of a pedal crank drive of the bicycle.

6. A bicycle as claimed in claim 5, wherein the instantaneous pivot centre is disposed adjacent to the axis of the drive in the second end setting of the linkage.

7. A bicycle as claimed in claim 1, wherein a rearward one of the links extends forwardly from the arm with respect to the fore and aft direction.

8. A bicycle as claimed in claim 1, wherein a forward one of the links extends rearwardly from the arm with respect to the fore and aft direction.

9. A bicycle as claimed in claim 8, wherein the forward one of the links additionally extends downwardly from the arm.

10. A bicycle as claimed in claim 1, wherein a rearward one of the links extends forwardly and a forward one of the links rearwardly from the arm and the links extend convergently in direction away from the rear wheel in the first end setting of the linkage.

11. A bicycle as claimed in claim 1, wherein a rearward one of the links is connected with the frame at a seat tube thereof.

12. A bicycle as claimed in claim 1, wherein a forward one of the links is connected with the frame at a down tube thereof.

13. A bicycle as claimed in claim 1, wherein the links are substantially identical.

14. A bicycle as claimed in claim 1, wherein the links are connected with the swing arm and the frame by connecting means comprising deep-groove, full complement bearings.

15. A bicycle as claimed in claim 1, wherein the links are machined or moulded components.

16. A bicycle as claimed in claim 1, wherein the links are connected with the swing arm and the frame by connecting means comprising a single continuous pivot pin at each pivot point.

17. A bicycle as claimed in claim 1, wherein a spring and damper unit is pivotably connected with the arm and frame to provide sprung and damped travel of the linkage between its end settings.

18. A bicycle as claimed in claim 17, wherein the spring and damper unit is adjustable in position relative to the arm and frame to vary the springing and damping rates of the unit.

* * * * *